Patented Aug. 22, 1944

2,356,516

UNITED STATES PATENT OFFICE 2,356,516

PROCESS FOR THE MANUFACTURE OF HYDROPHILIC POLYMERIZATION PRODUCTS OF THE SUPERPOLYAMIDE TYPE

Max Hagedorn, Dessau, Germany; vested in the Alien Property Custodian

No Drawing. Application September 5, 1940, Serial No. 355,454. In Germany July 18, 1939

4 Claims. (Cl. 260—78)

This invention relates to the manufacture of hydrophilic polymerization products of the superpolyamide type, said products being swellable in water and capable of being rendered water-soluble by application of heat.

The polymers known under the term superpolyamide up to now are manufactured by the condensation of monoamino-carboxylic acids or by reacting together diamines and dicarboxylic acids until condensation occurs. These products have chiefly been investigated with a view to obtain good thread-and film-forming qualities and as little water sensitivity as possible. The said products show in their chemical structure a certain similarity with the natural polypeptides and protein compounds, whereas their physical qualities differ largely from those of the said natural compounds.

It is an object of the present invention to change the structure of the synthetic linear highpolymers of the superpolyamide type in a sense to render them more similar to the aforesaid natural products.

A further object of this invention is to obtain superpolyamide condensation products which in their behavior towards water approach the physical characteristics typical for gelatin and glue.

These and other objects will become apparent from the following detailed specification.

According to this invention hydrophilic linear condensation products of the superpolyamide type are produced by heating a hydrohalide of an ω-amino carboxylic acid with at most three carbon atoms between the amino- and the carboxyl group with polyamide forming substances until condensation occurs. The products of this condensation or polymerization process are swellable in water and are easily rendered water-soluble by raising the temperature.

It has already been proposed to use the hydrohalides of short-chain amino carboxylic acids and their derivatives in the manufacture of polyamides. In this case they serve as catalysts to introduce or to promote the condensation of the chain units from which the superpolyamides are built up. In view of this purpose only quite small quantities of them were added to the reaction mixture and in order to exclude any undesired influence on the quality of the polymerization product, methods were taken to prevent the shortchain amino carboxylic acid units from entering into the resulting superpolyamide. If, however, the hydrohalides of the amino carboxylic acids with at most three carbon atoms between the amino and the carboxyl group are applied in a quantity of at least 20% or more, then the quantities of the resulting superpolyamides are changed fundamentally. Depending on the amount of hydrohalide applied the reaction products are swellable or colloidally soluble in water, whereas the aqueous solution at elevated temperatures constitutes a sol. It is changed into a gel on cooling.

The essential feature of our new process is the condensation of a short-chain ω-amino carboxylic acid with at most three carbon atoms with a longchain polyamide forming substance.

As the short-chain component the hydrohalides of the lower aliphatic amino carboxylic acids, such as ω-amino carboxylic acids, amino acetic acids, α- or β-amino propionic acid, α-, β- or γ-amino butyric acid, their amide-forming derivatives such as the esters, amides, anilides, etc., are to be used. It is recorded to apply the hydrochlorides of the methyl ethyl esters of the aforesaid amino carboxylic acids, since these are easily obtainable and most resistant to heat. Furthermore also the hydrohalides of aromatic amino carboxylic acids may be used provided that the amino- and the carboxyl groups are separated by one, two or three carbon atoms as in the case of anthranilic acids.

As a long-chain component for our new process all polyamide forming substances known in the prior art may be used. By way of example may be mentioned δ-amino valeric acid, ε-amino capronic acid and their higher homologues either in the form of their free acids or their condensable derivatives, such as lactams, esters, acid amides, acid chlorides and the like. It is to be understood that these reaction components may contain aliphatic or aromatic substituents. Interpolymers, such as for instance those described in the copending U. S. patent application Ser. No. 323,512, filed March 12, 1940, may be used with advantage.

Instead of the ω-amino carboxylic acids the long-chain component of our new process may be a mixture of the long-chain dicarboxylic acids and long-chain polymethylene-diamines either in the form of the said compounds themselves, their neutral salts or their condensable derivatives. The diamines shall contain at least five, the dicarboxylic acids at least six carbon atoms between the amino groups and the carboxyl groups respectively. They too may contain aliphatic or aromatic substituents. The mention herein of these dibasic carboxylic acids and diamines, as in the case of the amino acids previously mentioned, is intended to refer also to the corresponding amide-forming derivatives of these reactants which are likewise useful in the production of polyamides.

The characteristics of the condensation products as to the melting point, solubility, etc., may for instance be varied by condensing mixtures of long-chain and short-chain units provided that the percentage of the short-chain units in comparison to the long-chain units amounts to 10%. Under the same provision also other aliphatic or aromatic condensable substances may be added as well as such compounds which do not enter the mixed condensate, but merely act as softeners. It is obvious that it lies within the scope of my invention to apply mixtures of several components. Thus it is not indispensable to combine at least one long-chain component with the single short-chain component.

The condensation of the long-chain and the short-chain components is carried on in an indifferent atmosphere free from oxygen at temperatures between 150 and 250° C., advantageously 180 and 220° C. in the melt. An indifferent medium may be present, whereas the addition of a special catalyst may in general be dispensed with. When the reaction is finished, the toughly viscous melt coagulates to a hard transparent or translucent resin when cooled.

The new superpolyamide products made according to the present invention are not only water-soluble at elevated temperature, but can easily be dissolved in mixtures of water with organic hydrophilic solvents, such as methanol, acetic acid, etc.

My new superpolyamides are most useful as textile assistants, for instance thickening agents for printing pastes, sizing etc.

Due to the behavior towards water they may be applied as coatings on panes of glass or translucent plastics, where humidity on that material must be absorbed. Since the new superpolyamides resemble gelatin in many respects, they may be used in the photographic industry for all purposes in the manufacture of light sensitive materials in the form of plates, films, papers, wherein the new products are used as a substitute for gelatin and glue. They are suitable for instance as a carrier for light sensitive substances such as dichromates, iron salts, silver halides, dye-azo-compounds. Furthermore the polyamides may be applied to form non-curling antihalo (antistatic) filter layers and protective coatings on photographic films or papers. The usual additions, such as stabilisizers, matting substances, color formers, coupling components and glycerol may be added to the polyamides for the same purposes and with the same effect as gelatin. If desired, the aforesaid photographic layers may be prepared not entirely from polyamide, but from a mixture of polyamides with gelatin. The melting point, the solubility and the other physical qualities of these mixtures may be adjusted by varying the relative proportions of both substances.

Example I 120 grams $\epsilon$-caprolactam are thoroly mixed with 30 grams glycocollethylester hydrochloride and heated at 194–198° C. during 20 hours in a carbon dioxide atmosphere after careful displacement of the air by carbon dioxide. The main portion of the gaseous reaction products which escape is ethylalcohol. 125 grams of the solidified and pulverized reaction product are thoroly extracted with acetone and yield 90 grams of a red-brown dry powder. This is insoluble in cold water. After a short treatment with cold water for the removal of the coloring water-soluble impurities, it dissolves, however, into a clear solution in hot water which solidifies after cooling into a deep-red, soft jelly. This jelly dries into a clear film. It is reversibly precipitated by electrolytes and irreversibly by alkalies.

If the proportion lactam:glycocoll is reduced from 4:1 to 3:1, the solubility in water is increased until the aqueous solution at a ratio 7:3 solidifies very incompletely when cooled down. To increase the proportion of the long component, on the other hand, reduces rapidly the solubility also in hot water; at the ratio lactam:glycocoll 9:1 the solubility in water has completely disappeared.

Example II

If the glycocollethylester hydrochloride in Example I is replaced by glycocollhydrochloride and condensed at 240° C. for 5 hours, a high polymeric reaction product of similar properties is obtained, which solidifies after purification with acetone (by extraction or precipitation from the hot aqueous solution) into a jelly from the hot aqueous solution. After drying it yields clear films insoluble in $NH_3$ (ammonia).

Example III 140 grams $\epsilon$-caprolactam and 60 grams anthranilic acid ethylester hydrochloride are heated at 230° C. for 16 hours under the same precautions as in Example I. The reaction product is a feebly yellow resin of medium hardness. The solution in water solidifies into a white mass having the consistence of curd. If the finely distributed reaction product is further very well dispersed in water, the centrifuged product gives with hot water again a clear solution which, however, solidifies into an opaque gel. The film thus obtained by drying is very feebly turbid, otherwise colorless.

If the ratio lactam:anthranilic acid is shifted from 7:3 over 6:4 to 5:5, the solubility in hot water remains intact, the capability of solidification, however, decreases rapidly. At a ratio 6:4 only a strong increase of viscosity occurs in the cold and at an even ratio of the components in the reaction the reaction product is clearly soluble in water, even in the cold.

Example IV 65 grams $\epsilon$-caprolactam and 35 grams anthranilic acid hydrochloride are heated at 200–205° C. for 24 hours under carbon dioxide. The yellow-green solid resin dissolves milkily in hot water and solidifies when cooled down. The increase of the portion of anthranilic acid hydrochloride in the reaction causes clear solubility of the polymeric reaction product in hot water. Such solutions, however, do not solidify any more when cooled down.

Example V

The reaction products as obtained according to Example IV from 80 grams $\epsilon$-caprolactam and
 (a) 15 grams anthranilic acid ethylester hydrochloride+5 grams glycocollethylester hydrochloride,
 (b) 10 grams anthranilic acid ethylester hydrochloride+10 grams glycocollethylester hydrochloride,
 (c) 5 grams anthranilic acid ethylester hydrochloride+15 grams glycocellethylester hydrochloride show generally the properties which are to be expected from their chemical constitution. The somewhat turbid, dark red solution of (a) in hot water solidifies into a yellow curd, the also feebly turbid hot solution of (b) solidifies in the cold into a light brown smear. The reaction (c) behaves like (b), but the hot solution is completely clear.

*Example VI*

300 grams ε-caprolactam are thoroly mixed with 80 grams anthranilic acid and 20 grams glycocollethylester hydrochloride and heated under carbon dioxide at 200° C. for 8 hours, then at 120° C. for 5 hours and finally again at 200° C. for further 6 hours. The reddish, slightly sticky resin dissolves in hot water into a feebly turbid solution which solidifies after cooling into a soft paste, if a 10% solution is used as starting material.

What I claim is:

1. A process for making hydrophilic linear polyamides which comprises heating to polymerizing temperature until condensation takes place the hydrohalide of an omega monoaminomonocarboxylic acid containing at most 3 carbon atoms between the amino- and carboxyl groups, with a polyamide-forming composition consisting of an omega monoaminomonocarboxylic acid containing at least 4 carbon atoms between the amino- and carboxyl groups, said hydrohalide being present in an amount of from 20% to 100% by weight of said polyamide-forming composition.

2. A hydrophilic linear polyamide which comprises the reaction product of a polyamide-forming composition and, in amount of from 20% to 100% of said composition, of the hydrohalide of an omega monoaminomonocarboxylic acid containing at most 3 carbon atoms between the amino- and carboxyl groups, said polyamide-forming composition consisting of an omega monoaminomonocarboxylic acid containing at least 4 carbon atoms between the amino- and carboxyl groups.

3. The process set forth in claim 1 in which said hydrohalide is the hydrochloride.

4. The hydrophilic linear polyamide set forth in claim 2 in which said hydrohalide is the hydrochloride.

MAX HAGEDORN.